(12) United States Patent
Davis et al.

(10) Patent No.: US 12,260,534 B2
(45) Date of Patent: Mar. 25, 2025

(54) METHOD TO DETECT CAMERA BLEMISHES

(71) Applicant: Communications Test Design, Inc., West Chester, PA (US)

(72) Inventors: Nidhin Davis, Glen Mills, PA (US); Timothy Hopfer, Downingtown, PA (US); Mark Parsons, West Chester, PA (US)

(73) Assignee: Communications Test Design, Inc.

( * ) Notice: Subject to any disclaimer, the term of this patent is extended or adjusted under 35 U.S.C. 154(b) by 331 days.

(21) Appl. No.: 17/660,768

(22) Filed: Apr. 26, 2022

(65) Prior Publication Data

US 2023/0342897 A1    Oct. 26, 2023

(51) Int. Cl.
*G06T 7/00*    (2017.01)
*G06T 3/40*    (2024.01)

(52) U.S. Cl.
CPC .............. *G06T 7/0002* (2013.01); *G06T 3/40* (2013.01); *G06T 2207/20216* (2013.01); *G06T 2207/20224* (2013.01)

(58) Field of Classification Search
CPC ...................... G06T 7/0002; G06T 3/40; G06T 2207/20216; G06T 2207/20224
See application file for complete search history.

(56) References Cited

U.S. PATENT DOCUMENTS

| | | | |
|---|---|---|---|
| 7,340,109 B2 | 3/2008 | Steinberg et al. | |
| 7,474,847 B2 | 1/2009 | Nikkanen et al. | |
| 7,548,262 B2 | 6/2009 | Nikkanen et al. | |
| 7,627,240 B2 | 12/2009 | Nikkanen | |
| 7,683,946 B2 | 3/2010 | Steinberg et al. | |
| 7,733,391 B2 | 6/2010 | Nikkanen et al. | |
| 7,761,257 B2 | 7/2010 | Matsuzawa | |
| 7,853,097 B2 | 12/2010 | Ishiga | |
| 7,889,266 B2 | 2/2011 | Nikkanen et al. | |
| 7,949,802 B2 | 5/2011 | Gallant et al. | |
| 8,013,909 B2 | 9/2011 | Nikkanen et al. | |

(Continued)

FOREIGN PATENT DOCUMENTS

| | | |
|---|---|---|
| CN | 108548654 A | 9/2018 |
| CN | 110868586 A | 3/2020 |

(Continued)

OTHER PUBLICATIONS

Imatest. (2020). Using blemish detect. Imatest | Image Quality Testing Software & Test Charts. https://www.imatest.com/support/docs/2020-1/blemish/ (Year: 2020).*

(Continued)

*Primary Examiner* — Edward F Urban
*Assistant Examiner* — Ashley L. Hytrek
(74) *Attorney, Agent, or Firm* — Duane Morris LLP

(57) ABSTRACT

A method of detecting a blemish in a digital camera includes capturing a digital image of a white area by the digital camera; reducing resolution of the digital image by grouping pixels of the digital data into a matrix of a plurality of data blocks; and comparing a luminance value of each of the plurality of data blocks to an average luminance value of other data blocks of the plurality of data blocks within a predetermined region to determine if each of the plurality of data blocks is a potentially bad data block.

5 Claims, 6 Drawing Sheets

(56) References Cited

U.S. PATENT DOCUMENTS

| | | |
|---|---|---|
| 8,045,047 B2 | 10/2011 | Nikkanen et al. |
| 8,103,121 B2 | 1/2012 | Agarwala et al. |
| 8,106,956 B2 | 1/2012 | Nikkanen et al. |
| 8,675,987 B2 | 3/2014 | Agarwaia et al. |
| 8,797,429 B2 | 8/2014 | Zhang et al. |
| 8,879,869 B2 | 11/2014 | Zamfir et al. |
| 8,941,755 B2 | 1/2015 | Nikkanen |
| 9,294,687 B2 | 3/2016 | Nikkanen et al. |
| 9,338,245 B2 | 5/2016 | Jung et al. |
| 9,361,537 B2 | 6/2016 | Paliy et al. |
| 9,367,916 B1 | 6/2016 | Paliy et al. |
| 9,386,289 B2 | 7/2016 | Tuna et al. |
| 9,398,280 B2 | 7/2016 | Nikkanen et al. |
| 9,826,149 B2 | 11/2017 | Chalom et al. |
| 9,848,118 B2 | 12/2017 | Ollila et al. |
| 9,989,623 B2 | 6/2018 | Send et al. |
| 10,070,042 B2 | 9/2018 | Nikkanen et al. |
| 10,477,177 B2 | 11/2019 | El-Yamany et al. |
| 10,616,511 B2 | 4/2020 | Ain-Kedem et al. |
| 10,630,954 B2 | 4/2020 | Krestyannikov et al. |
| 10,791,310 B2 | 9/2020 | Nikkanen et al. |
| 10,896,494 B1 | 1/2021 | Katz et al. |
| 10,916,036 B2 | 2/2021 | Nikkanen et al. |
| 2003/0179418 A1* | 9/2003 | Wengender ............ H04N 1/401 358/509 |
| 2008/0285840 A1 | 11/2008 | Kawai |
| 2008/0317380 A1 | 12/2008 | Peng et al. |
| 2012/0105868 A1 | 5/2012 | Nomura et al. |
| 2012/0281123 A1 | 11/2012 | Hoda et al. |
| 2014/0016005 A1 | 1/2014 | Kishima |
| 2014/0204221 A1 | 7/2014 | Muukki et al. |
| 2016/0007229 A1 | 1/2016 | Gao et al. |
| 2016/0042224 A1 | 2/2016 | Liu et al. |
| 2020/0244950 A1* | 7/2020 | Wang .................... H04N 25/68 |
| 2022/0067394 A1 | 3/2022 | Suksi et al. |

FOREIGN PATENT DOCUMENTS

| | | |
|---|---|---|
| CN | 111541891 A | 8/2020 |
| EP | 0742431 A1 | 11/1996 |
| EP | 2089805 A2 | 6/2013 |
| EP | 3936917 A1 | 1/2022 |
| JP | 2002290994 A | 10/2002 |
| JP | 5825278 B2 | 12/2015 |
| WO | 2005041558 A1 | 5/2005 |
| WO | 2013153252 A1 | 10/2013 |
| WO | 2020223519 A1 | 11/2020 |
| WO | 2022046908 A1 | 3/2022 |

OTHER PUBLICATIONS

Relative luminance. (Dec. 15, 2020). Wikipedia, the free encyclopedia. Retrieved Sep. 27, 2024, from https://en.wikipedia.org/w/index.php?title=Relative_luminance&oldid=994452122 (Year: 2020).*

Lepistö, et al., "Blemish detection in camera production testing using fast difference filtering", J. of Electronic Imaging, Apr. 2009, 18(2): 020501, 3 pages.

International Search Report and Written Opinion for PCT Application No. PCT/US2023/019617 issued Jul. 26, 2023.

* cited by examiner

METHOD TO DETECT CAMERA BLEMISHES

BACKGROUND

The present disclosure relates to camera testing. More specifically, the present invention relates to a method to detect camera blemishes in a digital camera under test, for example a camera in a mobile device such as a smart phone or tablet.

During testing, operators manually check a camera picture of a digital camera under test to determine if there are any blemish defects in the lens or the image sensor. This is a very labor-intensive manual process. Automating this process would save time, reduce cost, and increase accuracy.

SUMMARY OF THE INVENTION

To overcome the problems described above, the present disclosure provides a test procedure that is fully automated such that a digital picture is taken of a white background by a camera under test and an algorithm is applied to determine if there are blemish defects in the camera. The procedure described ignores small particles in the test image to not cause false test failures. The disclosed method can detect the dust and ignore it, where other tests would detect even the smallest dust particles and return a camera failure.

The disclosed camera blemish test adds reliability. Operators can rely on the test to determine blemishes in the device camera lens and/or camera sensor without considering small dust particles. This speeds up testing as there is no need for retesting. Also, as small particles are ignored, there is no need to remove the finest dust particles from the light used for the test image prior to each test to ensure there are no particles.

A method of detecting a blemish in a digital camera, according to an embodiment, includes capturing a digital image of a white area by the digital camera; reducing resolution of the digital image by grouping pixels of the digital data into a matrix of a plurality of data blocks; and comparing a luminance value of each of the plurality of data blocks to an average luminance value of other data blocks of the plurality of data blocks within a predetermined region to determine if each of the plurality of data blocks is a potentially bad data block.

The method can further include determining a total number of potentially bad data blocks within a predetermined region centered around each of the potentially bad data blocks; identifying the potentially bad data block as a blemish if the total number of potentially bad data blocks around the potentially bad data block exceeds a threshold; and identifying the potentially bad data block as not a blemish if the total number of potentially bad data blocks around the potentially bad data block does not exceed the threshold.

In the method, the pixels of the digital data are grouped into a matrix of data blocks.

In the method, the luminance value of each of the data blocks is calculated by averaging respective color values for red, green, and blue of all of the pixels within each data block and then using the resulting average red, average green, and average blue color values in a luminance conversion formula.

In the method, a difference between the luminance value of each of the plurality of data blocks to the average luminance value of other data blocks of the plurality of data blocks must exceed a predetermined value to determine if each of the plurality of data blocks is a potentially bad data block.

A method of detecting a blemish in a digital camera, according to another embodiment, includes capturing a digital image of a white area by the digital camera; comparing each of a plurality of data blocks that include all of the digital data of the digital image to determine if a difference in luminance values of other of the plurality of data blocks exceeds a predetermined threshold, the threshold indicating a possible blemish.

The method can further include reducing the resolution of the digital image prior to the step of comparing.

The method can further include identifying each of the plurality of data blocks with a luminance value that exceeds the threshold as a potentially bad data block; and totaling the number of potentially bad data blocks within a predetermined region of each potentially data block.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

The purpose of the disclosed method to detect camera blemishes is to be able to identify problem areas in images from digital cameras that appear as blemishes, smears, non-uniformities, or shadows in a test image taken by a digital camera. These blemishes are not smudges or other debris over camera lens, but are defects with the camera itself including the lens or the image sensor. The method to detect camera blemishes is designed to ignore smudges or other small defects that can be removed by cleaning the lens.

The method requires taking a digital image of a uniform white test area. The luminance of the test area is set to an appropriate level for detecting blemishes.

Figure 1:
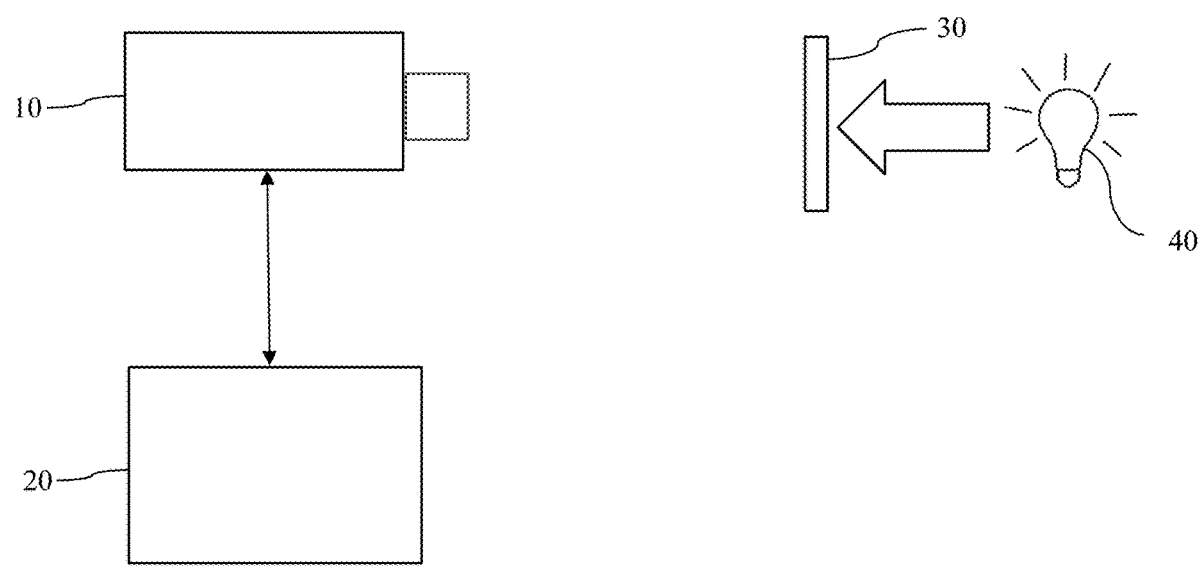
FIG. 1 shows a test set-up according to an embodiment of the current disclosure.

Although not required, preferably a camera under test is mounted in an automated test apparatus. Optionally, testing can be performed manually or semi-automatically. FIG. 1 is a block diagram of a test apparatus used to detect blemishes of a digital camera 10 under test. FIG. 1 shows that the digital camera 10 under test is driven by test electronics 20 to operate the camera 10 and receive and analyze a test image taken by the camera 10. The test electronics 20 can include a processor, memory, circuitry, and wiring to interface with the camera and a user. The camera 10 is driven by the test electronics 20 to capture a digital test image of a uniformly lit white test area 30. As shown in FIG. 1, the white test area 30 can be a diffuser panel that is backlit by a light source 40. Optionally, the white test area 30 can be a reflective sheet that is front lit and reflects uniformly.

Figure 2A:
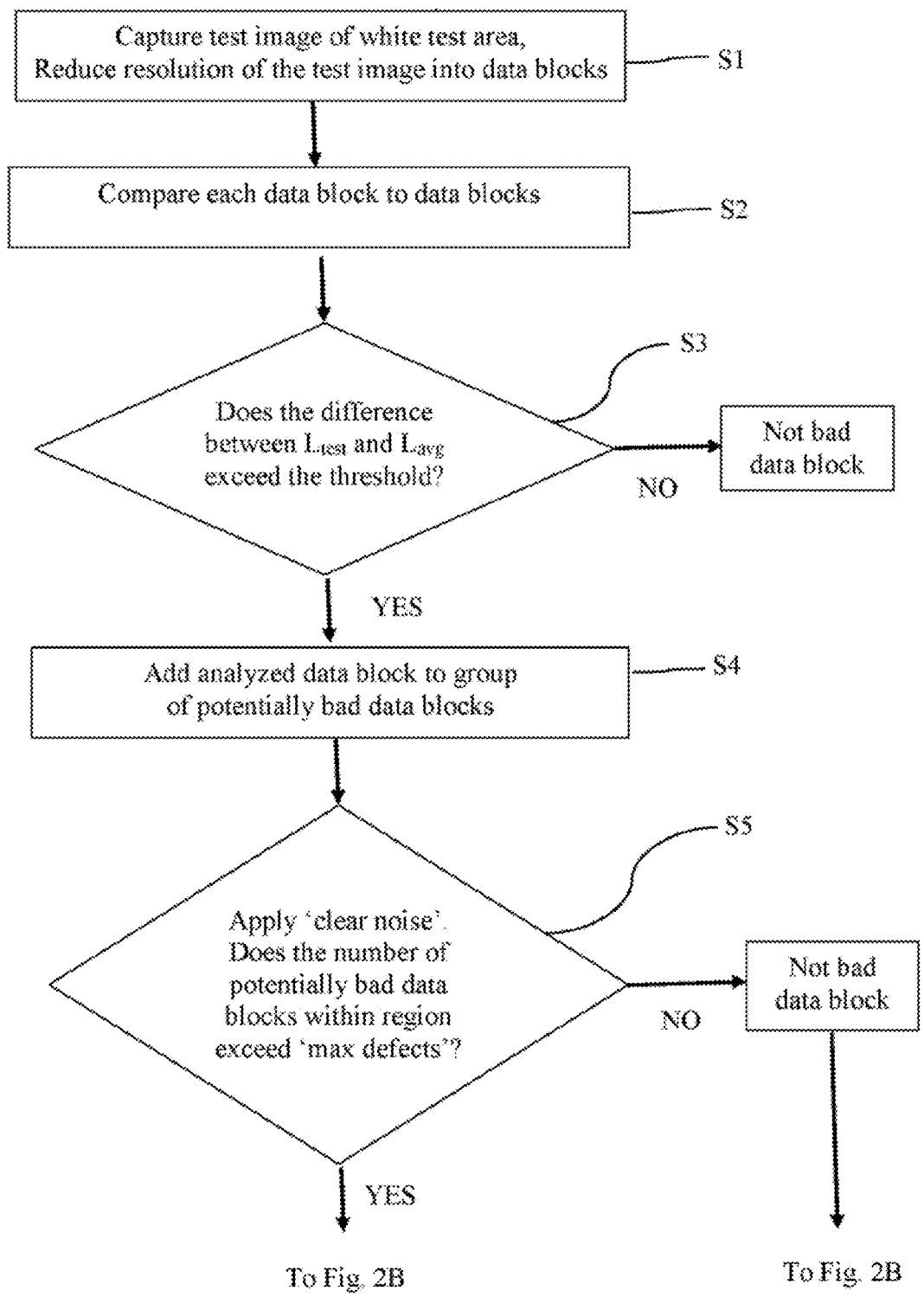
FIG. 2A is a flowchart of steps according to a method of the current disclosure.
Figure 2B:
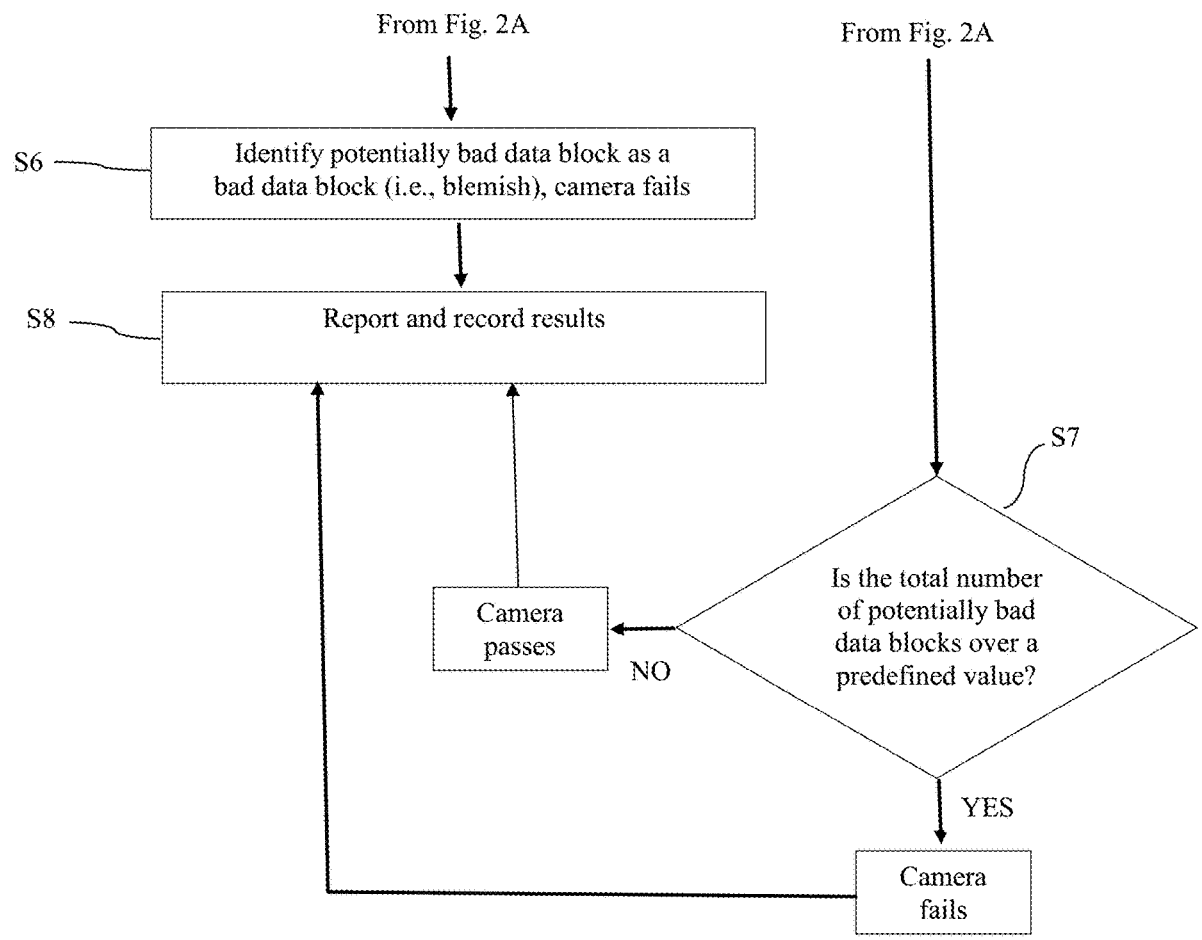
FIG. 2B is a continuation of FIG. 2A.

The disclosed test method is described with respect to the flowchart provided in FIG. 2A and continued in FIG. 2B.

Figure 3:
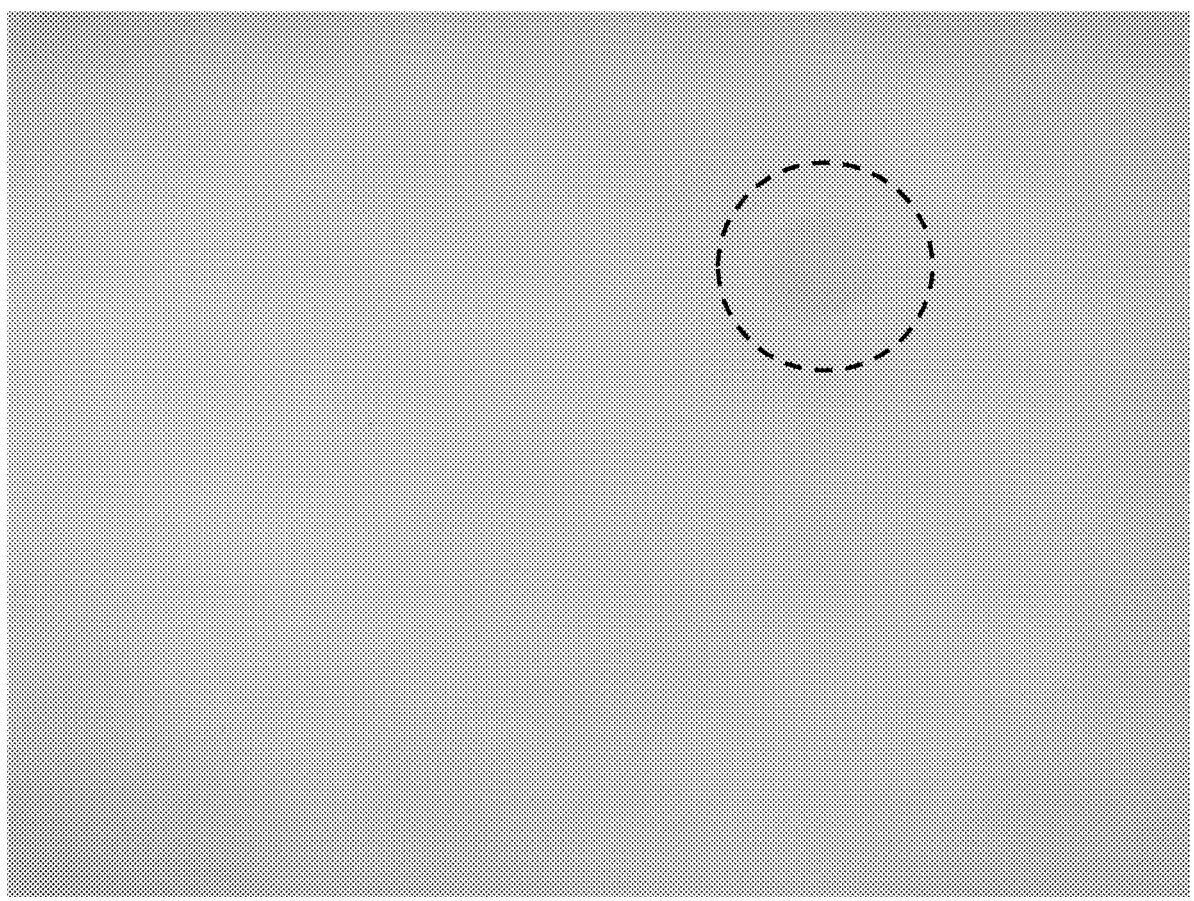
FIG. 3 is a representative test image taken of a uniformly lit white test area that includes a camera blemish.

In step S1, the test electronics 20 controls the digital camera 10 to take a test image of the white test area 30 and the digital data representing the test image is transmitted to the test electronics 20. FIG. 3 is a representative test image taken of the uniformly lit white test area 30 that includes a camera blemish shown has a non-uniform area within the overlaid dotted circle. The test electronics reduces the native resolution of the test image data by reformatting the test image data into blocks of pixels where each pixel includes a red, a green, and a blue sub-pixel. Other dimensions of a data matrix are possible, but a size of 16×16 has been found to provide suitable blemish detection while minimizing false results caused by noise or dust particles and speeds processing. The data matrix is created by combining the pixels of the test image data into, for example, 16×16 data blocks. The luminance value L of each data block is calculated by averaging the red, green, and blue color values of all of the pixels within each data block and converting the average color values into the luminance value L. The representative luminance value L of each data block is calculated using a conversion formula. For example, the luminance L can equal (0.2126*R)+(0.7152*G)+(0.0722*B), where R, G, and B are the average red, green, and blue color values for the digital image pixels within the corresponding data block. The new lower resolution data matrix can now contain 256 data blocks (DB1 to DB256) or regions to analyze. Averaging the luminance values of each 16×16 pixel block normalizes the test data and helps to sort out false failures caused by small specks of dust. The brightness of light reflected by small specks of dust or other contamination with the test area can be different than the light in nearby areas causing the brightness of the dust to stand out.

In step S2, the luminance value L of each data block is compared to luminance values L of surrounding data blocks. In the comparison, the luminance values L of three consecutive data blocks some distance away from the test data block being analyzed are averaged as $L_{avg}$. Those average luminance values $L_{avg}$ are compared to the luminance value of the test data block, $L_{test}$.

For example, when a data block that represents the upper left-most pixels of the test image data is being analyzed (i.e., DB1), its luminance value as $L_{test}$ can be compared to the average luminance value $L_{avg}$ of data blocks that have a gap from DB1 in a horizontal right direction or vertical down direction. The gap between the test data block being analyzed and the data blocks averaged can be predetermined based on the location of the data blocks in the matrix and how well the respective distances and locations of the data blocks reveal blemish defects. The gap can be ten data blocks or some other number. The surrounding data blocks used to compare to the test data block can be located in the horizontal, vertical, diagonal directions, or combinations thereof.

For example, the luminance of a test data block that is not near the edge of the data matrix can be compared to average luminance values of six pixels blocks on either side of the test data block. The first three pixel blocks can be in the same column as each other and located after the gap such that one of the pixel blocks is in the same row of the data matrix to the right of the test data block, one pixel block is in the row above, and one pixel block is in the row below. The luminance of these three pixels can be averaged. The second three pixel blocks can be in the same column as each other and located after the gap such that one of the pixel blocks is in the same row of the data matrix to the left of the test data block, one pixel block is in the row above, and one pixel block is in the row below. The luminance of these three pixels can be averaged.

Test data blocks located near the edge of the data matrix can be compared to average luminance values of pixels blocks to only one side of the test data block.

In step S3, a determination is made if the difference between the $L_{test}$ and the $L_{avg}$ is over a predetermined threshold. If the threshold is met, the test data block being analyzed is added to a group of potentially bad data blocks in step S4. If the threshold is not met, the test data block is determined not to contain a blemish. The threshold difference is determined empirically by experimentation of test samples with known blemishes.

Figure 4:
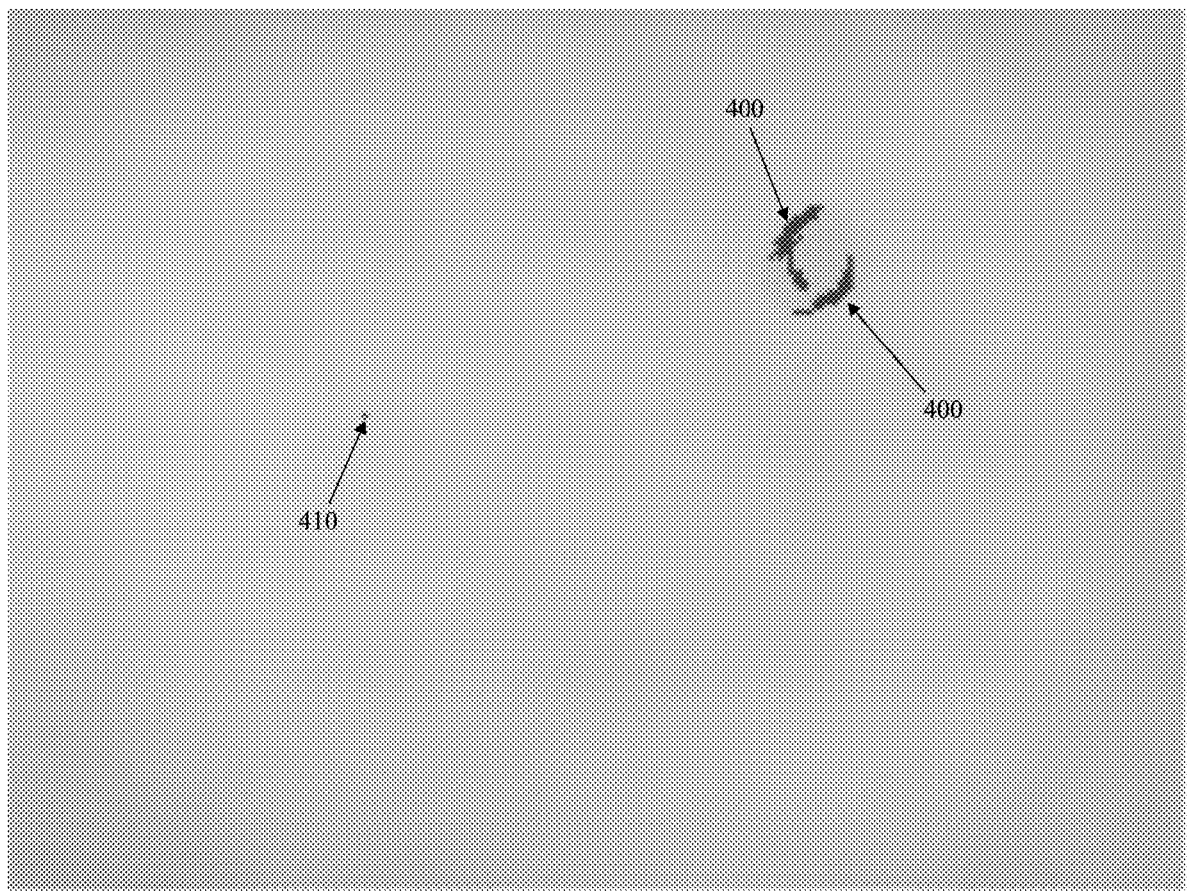
FIG. 4 is an image showing identified potentially bad data blocks.

FIG. 4 is an image showing identified potentially bad data blocks 400 and 410, marked as darker areas, overlaid on the test image shown in FIG. 3. FIG. 4 shows clusters of potentially bad data blocks 400 in an area with the blemish encircled in FIG. 3. The potentially bad data block 410 is in a location away from the blemish.

In step S5, a function named 'clear noise' is applied to identify bad data blocks and eliminate potentially bad data blocks that have dust and other image noise that are not considered to be bad data block or blemishes. Regions around each of the potentially bad data blocks are analyzed using the 'clear noise' function. In order for a potentially bad data block to be considered a bad data block, it must be within a cluster of a number of other potentially bad data blocks over a predetermined number of 'Max Defects'. For example, a group of 20×20 data blocks (400 total) around a potentially bad data block can be analyzed to determine how many other potentially bad data blocks are within the group.

If the total number of potentially bad data blocks within the group meet a threshold number (Max Defects), for example 25, then the potentially bad data block is determined to be a bad data block (i.e., a blemish) and identified as such in step S6, and the camera fails the test. If the total number of potentially bad data blocks within the group does not meet Max Defects, then the potentially bad data block is determined not to be a bad data block.

Figure 5:
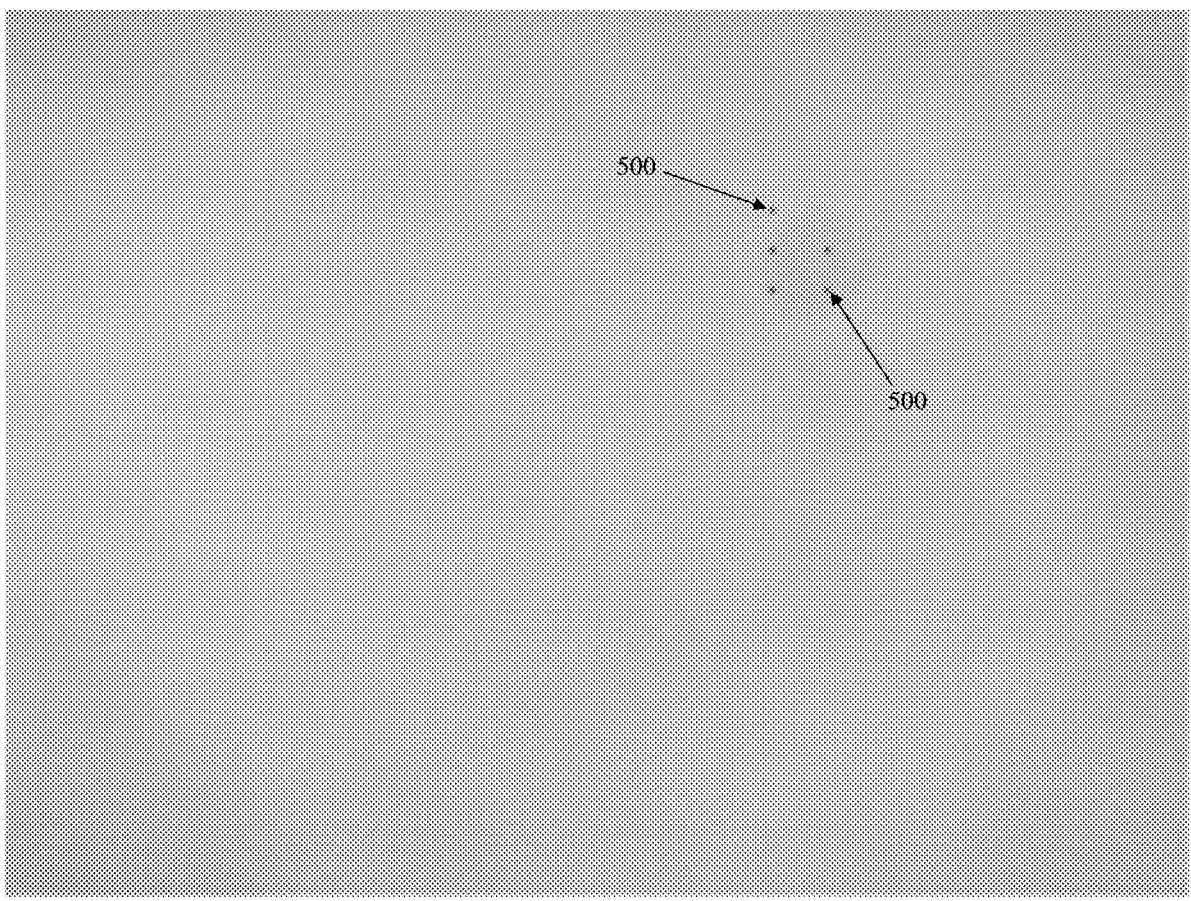
FIG. 5 is an image showing identified bad data blocks.

FIG. 5 is an image showing identified bad data blocks 500, marked as darker areas, overlaid on the test image shown in FIG. 3. The potentially bad data block 410 of FIG. 4 was determined not to be a bad data block. FIG. 5 shows five bad data blocks 500 in the area where clusters of potentially bad data blocks 400 were shown in FIG. 4. The camera fails the test because bad data blocks 500 have been identified.

If no potentially bad data blocks are determined to be a blemish in S6, a check is performed of the total overall image as a whole in step S7. If no blemishes are detected due to the lack of proximity of potentially bad data blocks to each other of the previously detected possible bad data blocks, but the total count of potentially bad data blocks is over a predefined number, the camera under test fails. This is in the event that too much debris or other errors occurred taking the image for a proper analysis to be performed.

In step S8, the results are reported to an inspector or test technician and recorded in a database. If any blemishes are detected during analysis, the camera is reported as a failure. Otherwise, the camera is reported to pass the blemish test.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Additionally, or alternatively, the above-described embodiments can be implemented as a non-transitory computer readable storage medium embodied thereon a program executable by a processor for performing a method of various embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of detecting a blemish in a digital camera, the method comprising:
   Capturing a digital image of a white area by the digital camera;
   Reducing resolution of the digital image by grouping pixels of the digital data into a matrix of a plurality of data block; and
   Comparing a luminance value of each of the plurality of data blocks to an average luminance value of other data blocks of the plurality of data blocks within a predetermined region to determine if each of the plurality of data blocks is a potentially bad data block;
   Wherein the luminance value of each of the plurality of data blocks equals $(0.2126*R)+(0.7152*G)+(0.0772*B)$, where R, G, and B are the average red, green, and blue color values for digital image pixels within the data block.

2. The method of claim 1, further comprising:
   determining a total number of potentially bad data blocks within a predetermined region centered around each of the potentially bad data blocks;
   identifying the potentially bad data block as a blemish if the total number of potentially bad data blocks around the potentially bad data block exceeds a threshold; and
   identifying the potentially bad data block as not a blemish if the total number of potentially bad data blocks around the potentially bad data block does not exceed the threshold.

3. The method of claim 1, wherein the pixels of the digital data are grouped into a matrix of data blocks.

4. The method of claim 1, wherein the luminance value of each of the data blocks is calculated by averaging respective color values for red, green, and blue of all of the pixels within each data block and then using the resulting average red, average green, and average blue color values in a luminance conversion formula.

5. The method of claim 1, wherein a difference between the luminance value of each of the plurality of data blocks to the average luminance value of other data blocks of the plurality of data blocks must exceed a predetermined value to determine if each of the plurality of data blocks is a potentially bad data block.

* * * * *